United States Patent
Hudson

(10) Patent No.: US 7,254,171 B2
(45) Date of Patent: Aug. 7, 2007

(54) EQUALISER FOR DIGITAL COMMUNICATIONS SYSTEMS AND METHOD OF EQUALISATION

(75) Inventor: John E Hudson, Stansted (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1213 days.

(21) Appl. No.: 09/849,927

(22) Filed: May 4, 2001

(65) Prior Publication Data

US 2001/0033614 A1  Oct. 25, 2001

Related U.S. Application Data

(63) Continuation-in-part of application No. 09/488,721, filed on Jan. 20, 2000.

(30) Foreign Application Priority Data

Jan. 22, 2001 (CA) .................................. 2331995
Jan. 22, 2001 (EP) .................................. 01300520

(51) Int. Cl.
*H03H 7/30* (2006.01)

(52) U.S. Cl. .................. 375/229; 375/230; 375/231; 375/348; 375/260; 375/267; 333/18; 708/305; 702/124

(58) Field of Classification Search ................ 375/148, 375/230, 231, 348, 260, 267; 333/18; 708/305; 702/124

See application file for complete search history.

(56) References Cited

U.S. PATENT DOCUMENTS 4,027,257 A * 5/1977 Perreault ..................... 333/18
4,058,713 A * 11/1977 DiToro ........................ 708/305
4,141,072 A * 2/1979 Perreault ..................... 702/124
4,152,649 A * 5/1979 Choquet ...................... 375/231
4,365,338 A * 12/1982 McRae et al. ............... 375/230
4,707,841 A * 11/1987 Yen et al. .................... 375/230
5,127,051 A * 6/1992 Chan et al. .................. 375/348

FOREIGN PATENT DOCUMENTS

FR    2 683 689 A    5/1993

OTHER PUBLICATIONS

Maiwald, D. et al.; An adaptive equalizer with significantly reduced numerical operations; Apr. 1978; IEEE International Conference on ICASSP; (Abstract-only).*

(Continued)

*Primary Examiner*—Chieh M. Fan
*Assistant Examiner*—Sudhanshu C. Pathak
(74) *Attorney, Agent, or Firm*—Barnes & Thornburg, LLP

(57) ABSTRACT

Equalisation of a communication channel is achieved through use of a Wiener filter frequency response mechanism that operates to transform at least a portion of a data stream generated from a plurality of space time coded (STC) symbol streams received from a plurality of transmit antenna elements into a packet spectrum. A training sequence for a channel through which the symbol streams have been sent is also transformed to a channel impulse response spectrum in order to assess the channel impulse response for the channel. The packet spectrum is equalised with the channel impulse response spectrum to produce an equalised packet spectrum in the transform domain. This is then converted into a time domain equalised data stream for recovery of originally transmitted information.

27 Claims, 6 Drawing Sheets

OTHER PUBLICATIONS

Dabak, A. et al.; Space Time Block Coded Transmit Antenna Diversity Scheme for WCDMA; 1999 IEEE; pp. 1466-1469.*

XP-000903426 "Synchronization for Single Carrier Modulation with Frequency Domain Equalization" Czylwik, A—IEEE Vehicular Technology Conference, NY: IEEE, US, vol. 3, Conf. 48, May 18, 1998—pp. 2277-2281.

XP-000804975 "Channel Estimation for OFDM Systems with Transmitter Diversity in Mobile Wireless Channels" Li, Y et al. IEEE Inc. New York, US vol. 17, No. 3, Mar. 1999—pp. 461-470.

* cited by examiner

| | | | |
|---|---|---|---|
| $h_1^r(0) + 0$ | $0 - h_2^i(0)$ | $-h_1^i(0) + 0$ | $0 - h_2^r(0)$ |
| $h_1^r(1) + h_2^i(0)$ | $h_1^i(0) - h_2^r(1)$ | $-h_1^i(1) + h_2^r(0)$ | $-h_1^r(0) - h_2^i(1)$ |
| $h_1^i(0) + 0$ | $0 - h_2^i(0)$ | $h_1^r(0) - 0$ | $0 + h_2^r(0)$ |
| $h_1^i(1) + h_2^r(0)$ | $h_1^r(0) - h_2^i(1)$ | $h_1^r(1) - h_2^i(0)$ | $h_1^r(0) + h_2^r(1)$ |
| $h_1^r(2) + h_2^i(1)$ | $h_1^i(1) - h_2^r(2)$ | $-h_1^i(2) + h_2^r(1)$ | $-h_1^r(1) - h_2^i(2)$ |
| $h_1^r(3) + h_2^i(2)$ | $h_1^i(2) - h_2^r(3)$ | $-h_1^i(3) + h_2^r(2)$ | $-h_1^r(2) - h_2^i(3)$ |
| $h_1^i(2) + h_2^r(1)$ | $h_1^r(1) - h_2^i(2)$ | $h_1^r(2) - h_2^i(1)$ | $h_1^i(1) + h_2^r(2)$ |
| $h_1^i(3) + h_2^r(2)$ | $h_1^r(2) - h_2^i(3)$ | $h_1^r(3) - h_2^i(2)$ | $h_1^i(2) + h_2^r(3)$ |
| $h_1^r(4) + h_2^i(3)$ | $h_1^i(3) - h_2^r(4)$ | $-h_1^i(4) + h_2^r(3)$ | $-h_1^r(3) - h_2^i(4)$ |
| $h_1^r(5) + h_2^i(4)$ | $h_1^i(4) - h_2^r(5)$ | $-h_1^i(5) + h_2^r(4)$ | $-h_1^r(4) - h_2^i(5)$ |
| $h_1^i(4) + h_2^r(3)$ | $h_1^r(3) - h_2^i(4)$ | $h_1^r(4) - h_2^i(3)$ | $h_1^i(3) + h_2^r(4)$ |
| $h_1^i(5) + h_2^r(4)$ | $h_1^r(4) - h_2^i(5)$ | $h_1^r(5) - h_2^i(4)$ | $h_1^i(4) + h_2^r(5)$ |
| ⋮ | ⋮ | ⋮ | ⋮ |

Layout of channel impulse responses in $\tilde{c}$

*Fig. 5*

EQUALISER FOR DIGITAL COMMUNICATIONS SYSTEMS AND METHOD OF EQUALISATION

RELATED APPLICATIONS

The present application is a continuation-in-part of co-pending U.S. patent application Ser. No. 09/488,721 filed Jan. 20, 2000.

FIELD OF THE INVENTION

The present invention relates, in general, to communication systems having non-ideal, i.e. colored, channels that produce non-uniform channel impulse responses. The present invention is particularly, but not exclusively, applicable to radio frequency communication systems, including second and third generation (3G) cellular systems, in which there is a packetisation of data, e.g. into time slots. The present invention finds particular application in downstream data transmission of CDMA-based Internet access systems, for example.

BACKGROUND OF THE INVENTION

Cellular wireless has enjoyed an extremely rapid growth from the 1980s, and there is now an almost widespread coverage of cellular radio services in industrialised countries. In recent years there has been a similar, albeit more rapid, growth in the demand and supply of data services in a wireless environment. Such data services include Internet and intranet traffic and other (principally packet-based) data transmission schemes. Indeed, demand for the support of data services can be seen by the amount of e-mail retrieval arid web browsing that already takes place in locations such as airport lounges, hotel lobbies, company conference rooms and dedicated rooms with ports for connection to electronic notebooks and lap top computers.

As will be appreciated, data traffic is both asymmetric in nature and is not time critical; this contrasts with a generally uniform bandwidth distribution in voice traffic and the requirement that voice traffic be subjected to a maximum latency for coherent information reception. More explicitly, far greater data bandwidth is necessary for a wireless access point to subscriber terminal (i.e. the so-called forward link or down link) than that bandwidth required in the reverse link or uplink direction. The asymmetry in data communication, as will be understood, arises from the fact that the uplink is generally used to solicit information (e.g. web pages) as opposed to relaying data files.

Cellular subscriber handsets, whilst fundamentally providing mobility, are nevertheless used when effectively stationary which may subject the subscriber handset (or the like) to fading conditions associated with the channel. Facing is a dominant process that adversely affects quality of service experienced in second generation cellular systems, such as the frequency division multiplexed (FDM) global system for mobile communication (GSM). Such second generation systems often operate in a time division multiplexed (TDM) downlink transmission mode to provide time diversity which attempts to address fading. Code division multiple access (CDMA) systems, however, are inherently less susceptible to channel and physical environments because spread spectrum transmissions provide diversity gain to mitigate adverse multipath effects like fading, with each channel in the CDMA system defined by a unique spreading code on a frequency carrier. Information recovery from an assigned channel resource in a CDMA-based system is therefore dependent upon knowledge of the spreading code. More specifically, each channel is comprised from a unique coded sequence of "chips" that are selected from a relatively long pseudo-random spreading sequence (typically many millions of bits in length). A communication device has access to an information-bearing channel by virtue of a communication device having particular and detailed knowledge of a specific code that identifies the specific bits used by the information-bearing channel.

The use of orthogonal Walsh codes for downlink transmit diversity antennas may be used to address fading and coloring of a channel through use of space-time transmit diversity (STTD) for non-dispersive channels; this is described in the paper "Space Time Block Coded Transmit Antenna Diversity for WCDMA" presented to the European Technical Standards Institute (ETSI) on 30 Oct. 1998 by Texas Instruments. Essentially, STTD provides a linear algebraic way of resolving out symbols in a channel through an interleaving mechanism of CDMA code words and, more particularly, the use of inverted and complex conjugated versions of interleaved CDMA code words in a diversity path. In STTD, the length of the CDMA code words support a certain capability for inter-symbol rejection.

Information (such as voice, data or video) is spread across all chips of the spreading sequences, with the processing gain of the system determined by the number of chips required to construct a single data bit. Essentially, the processing gain is a ratio defined by the number of chips required per symbol/bit (generally fixed for a second generation network). In general, it is therefore better that a receiver has a high processing gain in order that it is better able to distinguish each user signal against a background of other-user generated interference and system noise.

From a practical but exemplary perspective, a TDD-CDMA-based system may exhibit a frame structure of duration ten milliseconds (10 ms). Each frame will contain a number of slots or packets, say fifteen in total, of which at least one is usually assigned to function as a control channel. Dependent upon a spreading factor of the CDMA-based system (but assuming that the frame is indeed 10 ms in duration and fifteen slots in length), each packet or slot (of duration 667 µs) is 2560 chips in length. Each packet or slot further contains at least one (and usually at least two) data portion(s) and at least one training sequence interspersed between successive data portions. The training sequence always contains a relatively high number of chips (e.g. five hundred and twelve in one particular form) that can be contrasted with the relatively few chips assigned to a data symbol. The training sequence, which in essence is simply a burst of random data known to an addressed device, is therefore used to assess (by virtue of a cross-correlation function) a channel impulse response for channel equalisation purposes, with the length of the training sequence rendering it effectively immune to degradation in the downlink path. In a particular system, a CDMA code word, sometimes referred to as a "user symbol", comprises a maximum of 256 chips. Consequently, each slot or packet of each frame contains a total of at least ten symbols and, possibly, hundreds of symbols with 512 chips (i.e. two CDMA code words, for example) consumed as the training sequence. Putting this in a slightly different light, the 2048 remaining chips in a slot (2560–512 chips of the training sequence) comprise a number of CDMA code words based upon an applied (and varying) spreading factor. The spreading factor (SF) typically varies between, say, one and two hundred and fifty-six, with a spreading factor of sixteen therefore yielding one hundred and twenty-eight CDMA code words.

A high speed downlink Internet access system for nomadic users within a CDMA physical layer architecture is described in the paper "CDMA/HDR: A Bandwidth Efficient High-Speed Wireless Data Service for Nomadic Users" by Paul Bender et al, Pages 70 to 77, IEEE Communications Magazine, July 2000.

The use of equalisers (as opposed to RAKE receivers) in communication devices, e.g. handsets and the like, is commonly advocated for third generation applications since it enhances bit error rate (BER) performance and can increase spectral efficiency. The function of the equaliser is to mitigate symbol corruption induced by an imperfect channel, with an equaliser designed to condition data such that it appears to have been passed through, optimally, a perfect channel.

Equaliser design and particularly equaliser efficiency are presently constrained by processing overhead/workload. In the context of a mobile device, workload must necessarily be restricted because of its associated drain on battery power. Unfortunately, in a dispersive multi-path channel, finite impulse response (FIR) equalisers require a significant number of filter "taps"; with each tap representing a different weighting coefficient that is applied to a sample. Increasing the number of taps improves accuracy and effectiveness of the FIR equaliser. A significant problem occurs with implementation of FIR filters in equalisers, namely that the each sample applied to an input of the FIR equaliser must be multiplexed by each tap. In a typical CDMA-type system, by way of example, there are eight samples per chip and a chip rate typically in excess of 1 MHz; this results in significant workload for a digital signal processor. Indeed, in a bad time dispersive multi-path channel environment, a seventy-tap FIR could be required. A truncation of the number of taps would reduce computation load but at the cost of introducing side lobes into any frequency domain representation. Furthermore, if the sample rate of each tap is increased by N-fold in order to provide a requisite degree of oversampling, the number of taps required to span a certain time interval and maintain the frequency response also increases by N-fold. Consequently, there is a resultant $N^2$-fold increase in computation load. Thus, equalisers containing filters designed using straightforward FIR equalisation can be very expensive.

With respect to equalisers and mechanism of equalisation, these generally fall into one of several categories identified immediately below:

(i) Cholesky factorisation of the channel impulse response autocovariance matrix. This factorisation, which relies on matrix manipulation, is efficient when the autocovariance matrix is strongly banded, but this banding is only associated with low dispersion channels. After matrix factorisation, least squares filter equations are solved by back substitution, as usual in the Cholesky method, although the processing load is dependent upon the duration of the multipath spread. The Cholesky factorisation method can also be ill-conditioned and numerically unstable and some measure of accuracy in the computation is required;

(ii) Decision feedback equalisers (DFE). These uses a combination of forward FIR filtering, a threshold decision device (such as a hard limiter) and a feedback filter. Essentially, the feedback loop provides a mechanism that attempts to subtract echos by feeding back the channel impulse response (CIR). However, the channel subtraction mechanism provides error propagation problems. DFEs are commonly used in FDMA applications, such as the US $2^{nd}$ generation cellular phone receivers and telephone modem equalisers.

(iii) Zero-forcing filters synthesise an FIR filter and operate to equalise channel dispersion for a finite time span about an origin. For an n-tap FIR Filter, solving to a set of linear equations will always form a weight set such that the convolution of the sample channel impulse response $H_k$ and the Wiener filter response $W_k$ will have a combined impulse response which is zero at n−1 arbitrary points and has a central unit response at k=0; and (v) The Wiener least squares filter. This equalisation technique utilises a modified inverse filter which controls the white noise response of the filter, ie. the undesired enhancement of thermal noise from the antenna. If the discrete frequency response of the channel is $H_k$ and the thermal noise variance is $\sigma^2$, then the Wiener filter frequency response is:

$$W_k = \frac{H_k^*}{|H_k|^2 + \sigma^2}$$

The paper "Smart Antennas for Third Generation Mobile Radio Systems" by Martin Haardt (Siemens), Stanford Colloquium on Smart Antennas", July 1999, describes channel equalisation in terms of the Wiener filtering response, and explores how two or more receiving antennas can be included in the description of the received data. A further paper by H Sari et al titled "Transmission Techniques for Digital TV Broadcasting", IEEE communications magazine 33(2) February 1995, discusses channel equalisation in the context of the Wiener filter mechanism. STTD is included in the standards for 3G cellular systems in the European UMTS Terrestrial Radio Access (UTRA) system and similar systems in the American CDMA2000 proposals. Consequently, it is important for these STTD systems efficiently to implement data recovery and equalisation algorithms in battery powered mobile units.

In general, least squares solutions (such as (i) and (iv) above) are better than algebraic solutions and give better BER performance.

In a dispersive channel for space time transmit diversity (STTD), the channel impulse response matrix, data vector and antenna signals can be written in block vector form, with the antenna signals related to the CIR and data vector by a block convolution operation:

$$y_{2k} = \begin{pmatrix} Y_0 \\ Y_2 \\ Y_4 \\ \vdots \end{pmatrix} \quad d_{2k} = \begin{pmatrix} D_0 \\ D_2 \\ D_4 \\ \vdots \end{pmatrix} \quad h_{2k} = \begin{pmatrix} H_0 \\ H_2 \\ H_4 \\ \vdots \end{pmatrix}$$

$$y_{2k} = \sum_{\tau=0}^{2L} d_{2(k-\tau)} h_{2\tau}$$

The STTD operation results in the associated equaliser having to run at half the rate of the channel sampler; this compromises the capabilities of the equaliser to an extent that renders the performance of the equaliser worse than an equivalent equaliser without STTD. Furthermore, the performance of RAKE filters, when installed into the equaliser, is very poor in any significant multi-path.

Channel equalisation to address channel imperfections therefore poses implementation difficulties.

Joint user detection algorithms (JDAs) are usually reserved for CDMA systems that use low spreading factors (e.g. less than 32). JDA is an algebraic solution in the receiver that counters inter-user interference caused by multi-path in the radio channel, typically by using matrix algebra and linear equations. The multipath renders Walsh codes belonging to different users non-orthogonal to an extent dependent on amplitude severity. For this reason, JDA is of interest in high-speed data options of, for example, 3G standards where spreading factors down to four may be encountered at the highest data rates. It has been proposed that all available Walsh codes should be used in parallel for each user on the downlink for an asymmetric bandwidth "fat pipe" variant of the 3G standards, and under these conditions the channel equaliser or JDA is desirable. Unfortunately, a significant issue arises from that fact that JDAs are inherently processor-intensive operations and that JDAs are required in a handheld portable terminals in which battery drain is roughly proportional to the instruction processing rate of the processor and hence to the complexity of the algorithms. As such, there is a fundamental conflict between data recovery and effective mobile operation, with it being desirable to attain a low DSP computation count in order to extend battery life.

SUMMARY OF THE INVENTION

In accordance with a first aspect of the invention, there is provided a method of channel equalisation comprising: receiving a data stream generated from a plurality of transmit antenna elements; generating via a fast transform a packet spectrum of at least a portion of the data stream, the packet spectrum being a transform domain representation; receiving a training sequence for a channel through which the data stream has been sent and assessing a channel impulse response for the channel based on the training sequence; generating via a fast transform a channel impulse response spectrum in the transform domain for the channel impulse response; equalising the packet spectrum with the channel impulse response spectrum to produce an equalised packet spectrum in the transform domain; and converting the equalised packet spectrum into time domain equalised data for recovery of information.

Equalising the packet spectrum may further include: deconvolving transmitted and received data streams with respect to channel impulse response spectra, thereby to produce at least one equalised data stream.

Equalising the packet spectrum may also include performing a minimum mean square error (MMSE) spectral ratio comparison.

Preferably, the method truncates the channel impulse response spectra to limit processing and enhance accuracy associated with equalising the packet spectrum.

In a preferred method, assessing the channel impulse response for the channel based on the training sequence further includes assessing a matrix-valued channel impulse response.

The data stream may be distributed in slots across a plurality of frames, each slot including the training sequence.

Optionally, the data stream may be arranged such that a code-word level construction of an STTD transmitted signal is modified to a chip-level construction in which CDMA code words are interleaved at a chip level instead of being transmitted whole in sequence.

In another aspect of the present invention there is provided an equaliser comprising: a first input for receiving a data stream generated from a plurality of transmit antenna elements; a processor arranged to select a sub-slot of data from the data stream and to implement a fast transform on the sub-slot to generate a packet spectrum for the sub-slot of data, the packet spectrum being a transform domain representation; means for storing a channel impulse response spectrum generated from a fast transform of a channel impulse response of a channel through which the data stream has been sent, the channel impulse response spectrum being in the transform domain; a least squares spectral ratio comparator coupled to receive the packet spectrum and the channel impulse response spectrum, the least spectral ratio comparator having an output providing an equalised packet spectrum in the transform domain; and means for converting the equalised packet spectrum into time domain equalised data for recovery of information.

The equaliser preferably includes: means for deconvolving transmitted and received data streams with respect to channel impulse response spectra, thereby to produce at least one equalised data stream.

A memory may store a matrix-valued channel impulse response.

In a further aspect of the present invention there is provided an equaliser comprising an input, a RAM memory block, a RAM sample block, a spectrum ratio calculator having a first input connected to the RAM sample block and a second input connected to a RAM having an impulse response spectrum; wherein the equaliser is operable to: receive a data stream of digital signals; fill a RAM memory block; converting the signals by way of a fast Fourier transform operation to provide a sample RAM block $Y_k$ (packet spectrum) and providing the signals to a first input of an equaliser; and receive, at a second input of the equaliser, an impulse response spectrum held within the RAM, which impulse response spectrum is a fast Fourier transform of the channel impulse response; thereby to equalise the signals whereby to provide an equalised packet spectrum which undergoes an inverse fast Fourier transform to provide equalised packet waveforms.

The equaliser may be included in a communication device, such as a cellular radio or data terminal.

In an embodiment, the FFT method is applied to equalisation of Space Time Coded signals radiated from a number of transmitter elements and received at a number of receiver elements. The signals can be STTD signals; the signals can be transmitted in time division duplex mode (TDD) or frequency division duplex (FDD) mode. The signals can be data, and/or voice signals. The method of the present invention may be applied to least squares equalisation of transmit diversity schemes where any form of coding is applied to digitally modulated signals from two or more different antennas, or to the variously polarised components of one or more transmit antennas and which are known by a variety of names, such as orthogonal code transmit diversity, codeword diversity and so on. The method of the preferred embodiments may be extended to least squares equalisation of Space-Time coded (STC) signals received from the transmission of several digital data streams from two or more antennas, or polarised elements of a single or multiple antennas, to one or more receiving antennas or polarised elements of one or more antennas, which is employed with the aim of acquiring bandwidth expansion beyond a typical Shannon rate in a radio channel.

In accordance with yet another aspect of the invention, there is provided an integrated chip programmed to operate in accordance with the method of the present invention.

In generality, the present invention achieves equalisation of a channel through use of a Wiener filter frequency response mechanism that operates to transform both the received data and the channel impulse response into the frequency domain representations using a Fast Fourier Transform (FFT). Subsequently, spectral equalisation of resultant data spectra with a channel spectrum in the frequency domain yields a time-domain equalised packet spectrum that can be converted back into the time domain by an inverse FFT function. Ratio comparison of the data spectrum with the channel spectral and conversion back into the time domain equalises the channel to appear as almost white by resolving-induced inter-symbol interference. Matrix manipulation (i.e. transformation) of STTD samples (in the form of real and imaginary vectors) incident to a receive antenna allows FFT processing of encoded data, initially presented on either a chip-wise or symbol-wise basis in an information slot or packet. The matrix manipulation defines a set of samples seen at the receive antenna in terms of both a complex multiplexed transmitted sample sequence sent from a plurality of sources across separate paths that are affected by respective channel impulse responses. The principle of applying Fourier transformation techniques in equalisation is also applicable to systems employing multiple transmit elements and multiple receiver elements, such as in space-time coding (STC) schemes.

The present invention advantageously provides an improved method of equalisation and an associated equaliser for digital communication systems which use a number of coherent transmitter elements to achieve space-time transmit diversity (STTD) or an overall bit rate increase in space time coding. Beneficially, according to a preferred embodiment of the present invention, every data chip is passed through the channel impulse response. The mechanism underlying the preferred embodiments of the present invention is also, in general, a technique that enhances performance of the forward link in "fat pipe" CDMA systems, such as proposed to extend IS-95 CDMA base stations towards and into third generation cellular systems.

BRIEF DESCRIPTION OF THE DRAWINGS

Exemplary embodiments of the present invention will now be described with reference to the accompanying drawings, in which:

FIG. 5 shows a layout of channel impulse response in $\tilde{C}$; and

DETAILED DESCRIPTION OF THE PREFERRED EMBODIMENTS

There will now be described by way of example the best mode contemplated by the inventors for carrying out the invention. In the following description, numerous specific details are set out in order to provide a complete understanding of the present invention but may be put into practice with variations of the specific.

Figure 1:
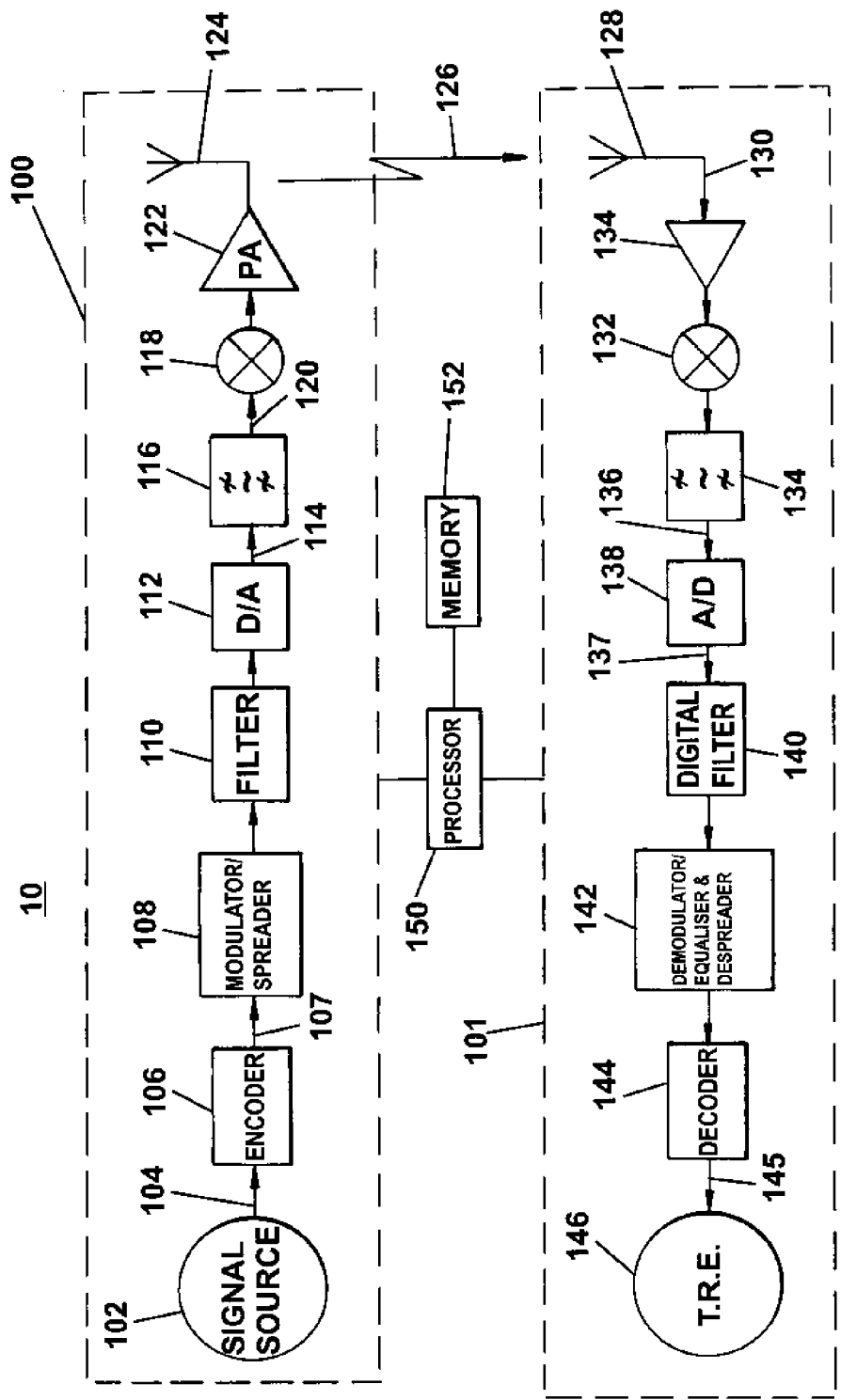
FIG. 1 shows a basic CDMA transmitter and receiver architecture.

Referring now to FIG. 1, there is shown a basic CDMA transmitter and receiver architecture 10. Transmit and receive chains 100, 101 may be combined in a transceiver arrangement of a station, such as a base station/Node B or a mobile device of a cellular radio system or the like. The transmit and receive chains could, of course, be implemented in isolation, whereby unidirectional (as opposed to bi-directional) communication is supported across, for example, an air-interface.

In transmit chain 12, signal source 102 generates signals 104 which are encoded by encoder 106, such as a half rate turbo coder. Encoded signals 107 signals are modulated and subjected to CDMA spreading by modulator/spreader 108 and then filtered by digital filter 110. Following filtering, a digital to analog (D/A) converter is arranged to produce analog signals 114 which are generally filtered in a second filter 116 to limit an aliasing effect at transmission. A mixer 118 up-converts baseband signals 120 to transmission frequencies prior to amplification in power amplifier 122 and transmission from antenna 124. Of course, as will be appreciated, some of the functional blocks in the transmit chain can be realised as discrete or collocated into a single chip or processing block.

Transmitted signals 126 are received by receive antenna 128 of an addressed station. Received signals 130 are communicated to a down-converting mixer 132 via an amplifier 134, which down-converting mixer typically produces an intermediate frequency signal for initial signal processing. A filter 134 isolates a desired frequency spectrum 136 for signal processing, which frequency spectrum is converted to a digital domain representation 137 by analog to digital (A-D) converter 138. The digital domain representation 137 is digitally filtered in digital channel filter 140 and then applied in series to a combined demodulator/equaliser slicer and RAKE despreader 142 and then a channel decoder 144. Recovered information 145 is ultimately received by terminal receiving equipment (TRE) 146. It will be understood that channel filtering generally distorts reflections in the channel response in the time domain; resulting side lobes in the filter response may therefore complicate processing, but this will be understood by the skilled addressee.

The transmit and receive chains 100, 101 are invariably processor controlled operations. By way of illustration, a controller 150 and associated memory 152 (which may be a combination of random access (RAM) and read only (ROM)) is shown as being common to both the transmit and receive chains 100, 101. The memory 152 stores control algorithms, such as equalisation and modulation algorithms, and also operands and incident data is subject to signal processing requirements. Furthermore, FIG. 1 can be adopted to support the underlying principles of the preferred embodiments of the present invention. Moreover, common circuitry between the transmit and receive chains can be shared to reduce component count, subject to the inclusion of suitable switching and regulating circuitry. Additionally, as will be understood, at least some of the functions within one or both of the transmit and receive chains 100, 101 can be implemented either entirely or partially as code, e.g. equalisation and demodulation.

CDMA-specific components can be replaced or substituted to support an arbitrarily selected communication protocol, e.g. an FDD environment employing TDM techniques.

Figure 2:
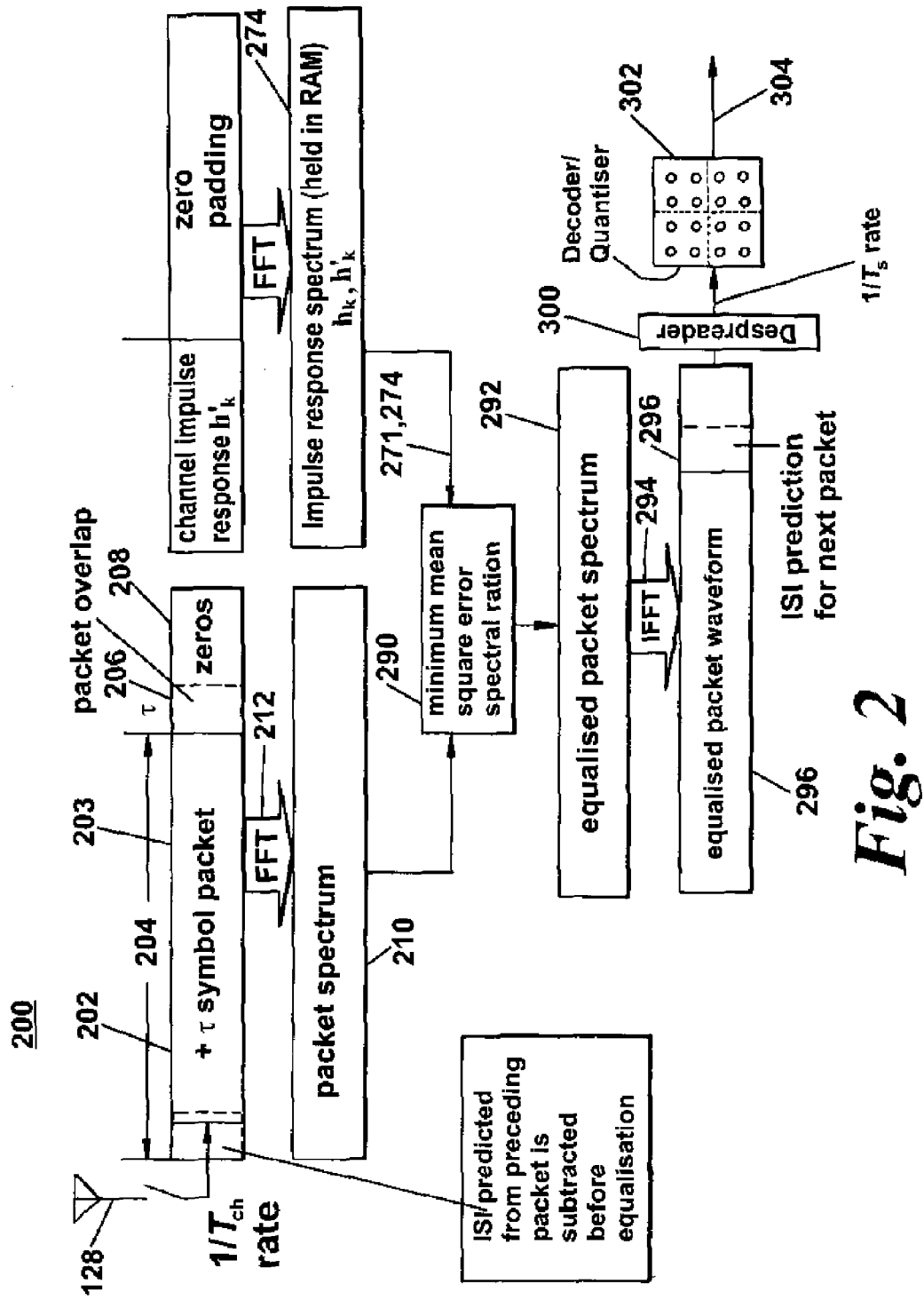
FIG. 2 is a diagrammatic illustration of a fast Fourier transform (FFT) channel equalisation technique and architecture according to a preferred embodiment of the present invention.

FIG. 2 is a diagrammatic illustration of a fast Fourier transform (FFT) channel equalisation technique and architecture 200 according to a preferred embodiment of the present invention. For the sake of explanation only, a preferred embodiment will be described in the context of a CDMA-based system.

Incoming signals 126 are received from the antenna 128 at a transmission rate of $1/T_{ch}$ of the system. The incoming signals are sampled into a sub-slot 202 of encoded data, the sub-slot being of arbitrarily selected length but preferably commensurate with a length assigned to a training sequence within each slot of each frame. Of course, the sub-slot could be of shorter or longer duration than the length (in chips) of the training sequence, but this is a design option. By way of practical implementation, an entire slot of a frame is sampled (A/D conversion) at the Nyquist rate and read into memory 152 prior to commencement of information recovery, with equal data field sub-slots 202 (in terms of chip length) broken out from the stored slot or packet. The incoming signals 126 can be received from any digital source of signals and are not restricted to wireless communications.

From a processing perspective, it is preferred that the sub-slot 202 is actually extended beyond a data field 203 of arbitrarily selected length 204, the sub-slot therefore including a packet (or sub-slot) overlap field 206 of length τ chips. In other words the overlap field 206 pertains to multi-path. The overlap field 206 is, more specifically, designed to address interference (e.g. echos) from adjacent chips or symbols. An overall length of the overlap field is therefore at least as long as the greatest expected channel impulse response (CIR) duration (presently understood to be seventy-one chips in length), although additional redundancy/tolerance may be preferred to support system development or refinement. The overlap field 206 is used to predict interference in a succeeding sub-slot, which interference results from symbol/chip echo, with the overlap field subtracted from the succeeding sub-slot to ensure isolation of data in that succeeding sub-slot.

With respect to a first processing chain associated with a data spectrum as opposed to channel response spectrum, the sub-slot 204 (containing the data field and the overlap 206) is converted into a frequency domain representation, termed a "packet spectrum" 210, in a fast Fourier transform (FFT) function 212. The FFT function 212 may be performed by a specific digital signal processor (DSP) or the processor 150 of FIG. 1. The packet spectrum 210 therefore assumes the form of an x-point, e.g. 512-point, FFT sample stored temporarily in RAM.

Figure 3:
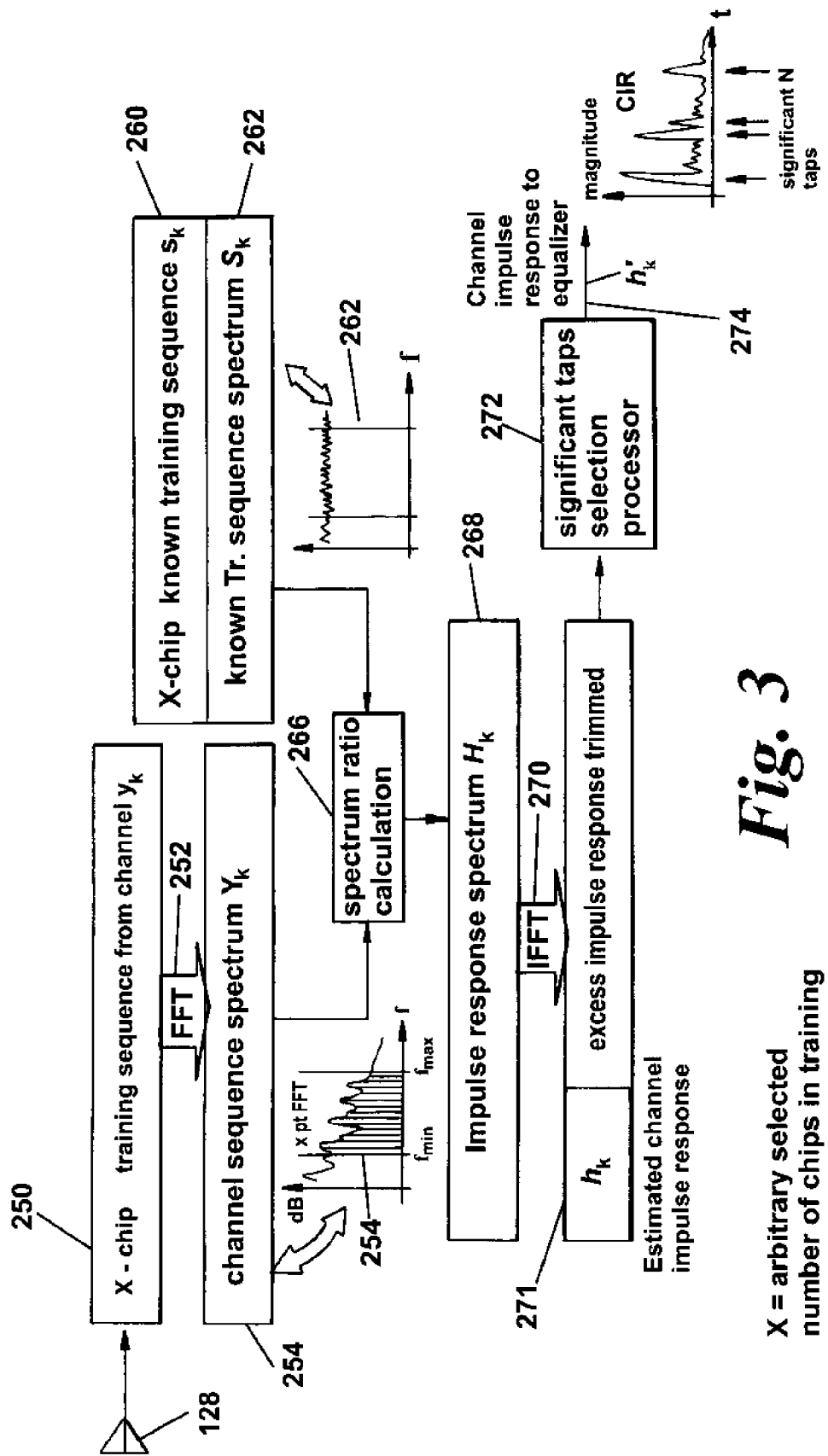
FIG. 3 is a diagrammatic illustration of a channel impulse response estimation process and architecture of a preferred embodiment of the present invention, the channel impulse response estimation process preferably used in relation to FIG. 2.

Before continuing with the description of FIG. 2, it is best to consider generation of a "channel spectrum" according to a preferred embodiment of the present invention; this is shown in FIG. 3. A training sequence 250, preferably located in and extractable from each slot of a frame, falls incident or receive antenna 128, which training sequence is demodulated in the receive chain (as will be readily appreciated) to recover the random sequence $y_k$, e.g. a generated pseudorandom number sequence. The recovered random sequence $y_k$ is subjected to a FFT function 252 (in a similar way to that previously described for the sub-slot) to produce a channel sequence spectrum $Y_k$ 254. Within the memory 152 associated with the receive chain there is stored a replica of the original training sequence $s_k$ 260, which original training sequence $S_k$ 260 has a corresponding known sequence spectrum $s_k$ 262 obtained by subjecting the original training sequence $S_k$ 260 to an FFT function. The known sequence spectrum $S_k$ 262 may simply be stored in the memory since it is this sequence spectrum $S_k$ 262 that is used to assess the channel impulse response.

It will be noted that the frequency domain sequence spectrum $S_k$ 262 is essentially flat with slight perturbations about a nominally constant magnitude. The sequence spectrum $S_k$ 262 is compared with the channel sequence spectrum $Y_k$ 254 in a cross-correlation function 266, such as realised by Wiener filter frequency response, namely $$W_k = \frac{H_k^*}{|H_k|^2 + \sigma^2},$$

thereby to produce an impulse response spectrum $H_k$ 268 that can be stored in memory for the duration of at least the related slot and longer if desired. Clearly, by storing the impulse response spectrum $H_k$ 268 for an extended period, processing overhead is reduced at the expense of accuracy in any correction of the variations in the channel. As will be understood, time alignment of the received and transmitted training sequences is required prior to cross-correlation.

Optionally, the impulse response spectrum $H_k$ 268 is further refined and so is subjected to an IFFT function 270 to generate an estimated time domain representation $h_k$ thereof having an arbitrary number of taps/channels that can be used as a matched filter, if desired. In other words, each tap is representative of a weight for the channel impulse response. Within the time domain, trimming of the number of taps reduces the channel impulse response to manageable processing levels, with the reduction reflecting the greatest expected channel impulse response (CIR) duration (presently understood to be seventy-one chips in length, although this number is an arbitrarily selected cut-off). From the reduced number of taps in the channel impulse response, most values will approximate to zero and so a control processor 272, based on a level or number threshold, selects only those N significant taps that most noticeably reflect the channel to produce a best estimate channel impulse response $h'_k$ 274. Selection of the N most significant taps may simply force lesser taps to be forced to zero. By limiting the channel impulse response to the most significant taps, processing is reduced and a final error in the channel limited. In the latter respect, it will be understood that all tap values will have an associated error from thermal noise, channel interference and other adverse channel and processing artefacts, so the compounding of errors is mitigated.

Returning now to FIG. 2, the packet spectrum 210 is compared, typically point by point, to the impulse response spectrum $h'_k$ 274 (or $h_k$ 270, if preferred) in a minimum mean square error (MMSE) spectral ratio comparator 290 to generate an equalised packet spectrum 292. The MMSE spectral ratio comparator 290 preferably satisfies the Wiener filter frequency response, namely $$W_k = \frac{H_k^*}{|H_k|^2 + \sigma^2}.$$

In the multiple receive antenna element case, least mean squares (LMS) interference cancellation in the equaliser 290 is possible by pre-whitening with N×N interference matrices.

In generality, it will now be appreciated that when the data channel F(ω) is divided by its own channel spectrum H(ω) then a resultant packet spectrum is a whitened version of the data channel F(ω). In other words, a ratio of the data spectrum to the channel spectrum compensates the data spectrum of a non-white channel by conditioning data such that the data appears to have passed through a perfect channel. Clearly, if the channel is non-dispersive, then the correlation between the sequence spectrum $S_k$ 262 and the channel sequence spectrum $Y_k$ 254 yields a null result for the CIR and no correction is applied by MMSE spectral ratio comparator 290. However, with multi-path in a dispersive, i.e. imperfect, channel, each sample (whether it is a chip or symbol) will generate a replica of the channel impulse response in the frequency domain, which replica can be corrected by the present invention through the application of a comparison function before conversion back into the time domain for data recovery. In overview, in contrast with existing and proposed joint detection algorithms (JDAs) that address multi-path in, for example, low spreading factor CDMA systems, the preferred embodiment of the present invention use a least squares Fast Fourier Transform deconvolution operation which is much simpler to implement. Equalisation can be performed at the symbol rate for QAM modulation or chip rate for CDMA.

The equalised packet spectrum 292 is applied to an IFFT function to provide an equalised packet (e.g. CDMA) waveform 296 in the time domain. The equalised packet waveform will include a small signal portion 298 of the overall waveform that will cause echo in a contiguous sub-slot, which small signal portion 298 can be tagged and temporarily stored in memory 152 for use in intersymbol interference cancellation in an immediately succeeding sub-slot, e.g. by a processor-controlled direct subtraction mechanism from the front-end of the immediately succeeding sub-slot. The equalised packet 296, in the case of CDMA, is applied to a despreading function 300 to attain a symbol rate $1/T_s$ of the system (where $T_s = T_{ch}$/spreading factor). The despreading function 300 can be realised by a matched filter. A decoder/quantiser 302, such as an eight or sixteen bit QAM decoder or a phase-shift keyed (PSK) decoder, is responsive to the symbol rate $1/T_s$ to recover the original data 304.

The preferred embodiment of the present invention can operate on signals transmitted in slotted time frames or otherwise on a bit-, chip- or symbol-wise basis.

In terms of processing overhead, if we assume a 256-point FFT to support a symbol packet of, say, one hundred and ninety-two chips, then the equalisation technique of the present invention is equivalent to a 256-tap FIR, albeit that DSP workload to support the FFT function is two $\log_2(256)$-tap filters, i.e. a relatively small fraction of the processing required in the equivalent digital filter. Furthermore, DSP load is independent of channel impulse response duration, whereby vehicular channels pose no particular problems. Use of the present invention provides an improved symbol-to-noise ratio for high power ratio ($E_b/N_0$), i.e. any system employing the FFT technique of the preferred embodiment is better able to address inter-symbol (or intercode) interference (ISI).

The capabilities of the single channel equaliser are next expanded in a further embodiment of the present invention to cover the cases of multiple transmitter elements and at least one receive element, such as in STTD and STC. Space time transmit diversity (STTD) has been recommended for dual transmit antenna elements for the third generation cellular system (see 3GPP Standards document TS25.211, "Physical channels and mapping of transport channels onto physical channels". 1999). Further elaboration to systems with more than two elements is discussed in 3GPP TSG RAN discussion document R1-00-0683_Tx diversity.doc, Samsung, "Further simulation results of Tx diversity for more than 2 antenna". More advanced applications in space time coding for bandwidth expansion and block coding methods compatible with the FFT equalisers of the preferred embodiments of the present invention are discussed by Tarokh et. al. "A. R. Space time block codes from orthogonal designs", IEEE Trans. Information Theory, 45(5) July 1999 pp. 1456–1647.

For completeness, it will be appreciated that STC is a collection of techniques for transmitting a number of parallel data streams from multiple transmit antennas with the aim of increasing bit rate for a given total transmitter power. In STC, it will be appreciated that the 2×2 frame structure is expanded to an N-element array, usually having at least four transmit elements. For example, in a four element STC transmitting antenna we might organise the user data in blocks of four symbols and transmit them in different order from the four elements via 16 channels to 4 receiving elements. This is a natural extension of the two element STTD procedure, the main difference from STTD being that multiple receiving elements are essential to get a bandwidth expansion in STC whereas STTD is aimed purely at improving the reliability of the received data and is not concerned with bit rate expansion. Thus STTD will function with a single receive antenna, while STC requires a minimum of two. The processing techniques underlying Eqn. (1) to Eqn. (9) below can be expanded to address the case of more than two transmit elements communicating to at least two receive antenna elements. The principle difference between the exemplary STTD arrangement (that is discussed in detail below) and STC is that each component of the block vectors and block matrices (for STTD given below) contains an increasing number of element (i.e. CIR samples, transmitted data samples and received data samples) consistent with the adopted coding method in each STC derivative.

Figure 4:
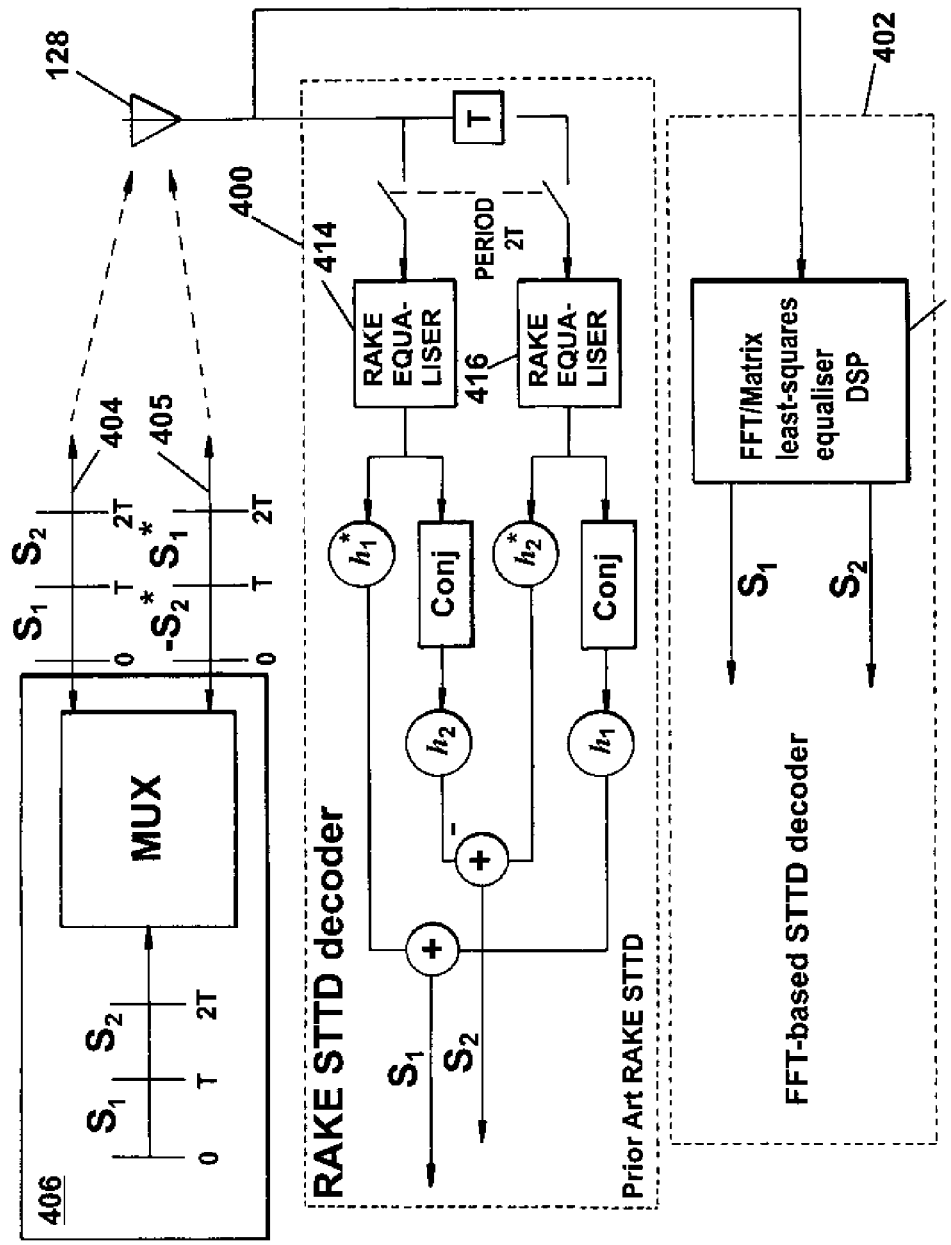
FIG. 4 compares a RAKE STTD equaliser structure with an FFT equaliser of the present invention.

FIG. 4 compares a RAKE STTD equaliser structure 400 with an FFT equaliser 402 of a preferred embodiment of the present invention. STTD signals 404, 405 are generated in and transmitted from multi-element transmitter 406. The S)TTD signals 404, 405 are incident to antenna 128 which feeds FFT-based equaliser decoder 402 (in the preferred embodiment) or RAKE STTD decoder 400 (in the prior art). As can be seen, the RAKE STTD receiver 410 requires time aligned parallel inputs and hence a time delay for a clocking period of 2; this contrasts with the direct coupling of the received signals into the FFT/Matrix MMSE equaliser DSP of the preferred embodiment. The RAKE STTD decoder 400 contains parallel paths each containing a RAKE equaliser 414, 416 that feed recover paths having assumed perfect channel gains for channel impulse responses $h_1$, $h_2$. As will be understood, and as shown (but not described in detail for the sake of brevity), conjugated and, as necessary, inverted versions of the specific channels are summed to recover data sequences $S_1$ and $S_2$.

In one embodiment of the invention, the FFT domain equalisation method of the present invention is extended to least squares reception of Space-time Transmit Diversity (STTD) modulated signals as described below; the technique removes inter symbol interference (ISI) and inter-code interference.

By way of illustration of the underlying principles of a preferred embodiment, in a standard STTD situation, the base station has two transmitting antennas and the addressed subscriber unit a single receiver antenna element. Given a baseband modulator simpler input sequence $s_1$, $s_2$, $s_3$, $s_4$, $s_5$, . . . , the base station transmits the following permuted baseband signals from the two antennas:

| $s_1$ | $s_2$ | $s_3$ | $s_4$ | $s_5$ | $s_6$ | = $X_1^T$ |
|---|---|---|---|---|---|---|
| $-s_2^*$ | $s_1^*$ | $-s_4^*$ | $s_3^*$ | $-s_6^*$ | $s_5^*$ | = $X_2^T$ |

The first antenna transmits the user symbols $S_1$, $S_2$, $S_3$, . . . as transmitted signal vector $X_1^T$, the symbols transmitted in the correct order as would occur if only a single transmitting antenna were in use. Meanwhile, the second antenna element transmits the sequence $-S_2^*$, $S_1^*$, $-S_4^*$, $S_3^*$, . . . In other words every pair of symbols is reversed in order, the first symbol of the pair is sign reversed and both symbols are complex-conjugated. The conventional method of processing these symbols in the receiver is shown in FIG. 4 (described below).

There are alternative sequences for arranging the transmitted STTD data to that (conventional) sequence provided above, which conventional sequence works quite well with a standard CDMA RAKE receiver and a low dispersion channel. Under high dispersion conditions, however, the conventional sequence works less well with both a RAKE receiver and an FFT equaliser receiver of the present invention. An improvement in rejection and equalisation can be obtained by rearrangement of the data through the substitution of symbol (i.e. code word) level coding by an equivalent chip level coding. If symbol $S_1$ has the chips $C_{11}$, $C_{12}$, . . . and symbol $S_2$ has the chips $C_{21}$, $C_{22}$, then the chip level STTD coding consists of transmitting $C_{11}$, $C_{21}$, $C_{12}$, $C_{22}$, $C_{13}$, $C_{23}$, . . . from the first transmit antenna element and $-C_{21}^*$, $C_{11}^*$, $-C_{22}^*$, $C_{12}^*$, $-C_{23}^*$, $C_{13}^*$, . . . from the second transmit antenna number element. In other words, the pairs of code words forming the STTD transmission structure are split up and interleaved at the chip level. Similar changes must be reflected in the construction of the channel and user symbol matrices. This modified form of operation would impair the performance of a RAKE receiver under high dispersion conditions, but improves the FFT-based equaliser receiver of the preferred embodiment.

A set of matrices is now developed in order that the FFT method of the present invention can be applied to the exemplary STTD coding format.

To organise the received signal samples into a matrix formulation, let the modulator data vector sequence $\{s_1, s_2, s_3, s_4, s_5 \ldots\}$ or its chip-level modification be $X=X^r+jX^i$ and the permuted sequence $\{-s_2, s_1, -s_4, s_3, -s_6 \ldots\}$ be $PX$. $P$ is a permutation and sign change matrix consisting of an identity matrix with some sign reversals and alternate columns exchanged. Eqn. (1) shows a permutation matrix which, when applied to the symbols radiated from the first antenna element, determine the symbols radiated from the second antenna element, $$P = \begin{pmatrix} 0 & -1 & & & & \\ 1 & 0 & & & & \\ & & 0 & -1 & & \\ & & 1 & 0 & & \\ & & & & 0 & -1 \\ & & & & 1 & 0 \end{pmatrix} \quad (1)$$

Let U be the complex signal radiated from the first antenna element and V that from the second antenna element. We have U=X, V=PX* For the real and imaginary parts of the received antenna signal Y in an ideal channel, we have $$\begin{pmatrix} Y^r \\ Y^i \end{pmatrix} = \begin{pmatrix} I & 0 & I & 0 \\ 0 & I & 0 & I \end{pmatrix} \begin{pmatrix} X^r \\ X^i \\ PX^r \\ -PX^i \end{pmatrix} = \begin{pmatrix} I+P & 0 \\ 0 & I-P \end{pmatrix} \begin{pmatrix} X^r \\ X^i \end{pmatrix} \quad (2)$$

In words, Eqn. (2) shows how the permutation matrix is applied to the symbols radiated from first element to determine the signals received at the receiver antenna element with the contribution from the second transmit antenna element implicitly included. The real and imaginary parts of the vectors are separate and stacked above each other in this equation. Eqn. (2) initially assumes a perfect channel.

The channels from first and second antennas elements to the addressed subscriber unit can be described by convolution matrices $A_1=A_1^r+jA_1^i$. and correspondingly $A_2=A_2^r+jA_2^i$. A convolution matrix is a Toeplitz matrix derived from the complex channel impulse response $\{h\}$ such that if the data vector is D, the convolution of D with the channel impulse response vector H is D©H=AD.

If $$A = \begin{pmatrix} h_0 & & & \\ h_1 & h_0 & & \\ h_2 & h_1 & h_0 & \\ \vdots & & & \ddots \end{pmatrix} \quad (3)$$

then $$\begin{pmatrix} Y^r \\ Y^i \end{pmatrix} = \begin{pmatrix} A_1^r & -A_1^i & A_2^r & -A_2^i \\ A_1^i & A_1^r & A_2^i & A_r^r \end{pmatrix} \begin{pmatrix} X^r \\ X^i \\ PX^r \\ -PX^i \end{pmatrix} \quad (4)$$

$$= \begin{pmatrix} (A_1^r + A_2^r P) & (-A_1^i + A_2^i P) \\ (A_1^i + A_2^i P) & (A_1^r - A_2^r P) \end{pmatrix} \begin{pmatrix} X^r \\ X^i \end{pmatrix}$$

In words, Eqn. (3) next shows how the convolution matrix is defined and is, in fact, the matrixed valued variant of the ideal CIR vector. This matrix A contains the channel impulse response and is organised is such a way that when it is multiplied into the transmitter sample vector the resultant vector is the received vector of samples with the distortion introduced by the channel multi-path. Eqn. (4) shows how this convolution matrix is combined with the permutation matrix above to give the vector of received samples when a two element STTD transmit antenna is used. $X^r$ and $X^i$ are long vectors of the real and imaginary parts. In other words, in Eqn. (4), knowing A, it is necessary to perform a convolution operation between two sequences, namely the CIR sequence A and the transmitted data sequence X to obtain the sequence of received samples Y at the receive antenna element.

The imaginary samples can be interspersed with the real samples in the vectors $X^r$, $X^i$, $Y^r$, $Y^i$ as follows:

$$\tilde{y} = \begin{pmatrix} Y_1^r \\ Y_1^i \\ Y_2^r \\ Y_2^i \\ \vdots \end{pmatrix} \quad \tilde{x} = \begin{pmatrix} X_1^r \\ X_1^i \\ X_2^r \\ X_2^i \\ \vdots \end{pmatrix} \tag{5}$$

Putting this a different way, Eqn. (5) shows how the real and imaginary parts of the transmitted and received and sample vectors are interleaved such that the real and imaginary parts of the samples appear alternately.

By performing corresponding row and column interchanges in the matrix A, a block circulant matrix in the equation $\tilde{y} = \tilde{c}\tilde{x}$ is obtained, provided the original channel convolution matrices $A_1$ and $A_2$ were circulant.

Eqn. (6) shows how corresponding operations must be done on the convolution matrix of Eqn. (4) to get the matrix $\tilde{c}$. The process consists of row-by-row interleaving followed by column-by-column interleaving (or vice-versa). The interleaved received sample vector $\tilde{y}$ is now related to the interleaved transmitted vector $\tilde{x}$ by the matrix product $\tilde{y} = \tilde{c}\tilde{x}$. A typical 4×4 block of matrix $\tilde{c}$ is as follows:

$$\begin{pmatrix} (A_1^r + A_2^r P)_{k,k} & (A_1^r + A_2^r P)_{k,k+1} & (-A_1^i + A_2^i P)_{k,k} & (-A_1^i + A_2^i P)_{k,k+1} \\ (A_1^r + A_2^r P)_{k+1,k} & (A_1^r + A_2^r P)_{k+1,k+1} & (-A_1^i + A_2^i P)_{k+1,k} & (-A_1^i + A_2^i P)_{k+1,k+1} \\ (A_1^i + A_2^i P)_{k,k} & (A_1^i + A_2^i P)_{k,k+1} & (A_1^r - A_2^r P)_{k,k} & (A_1^r - A_2^r P)_{k,k+1} \\ (A_1^i + A_2^i P)_{k+1,k} & (A_1^i + A_2^i P)_{k+1,k+1} & (A_1^r - A_2^r P)_{k+1,k} & (A_1^r - A_2^r P)_{k+1,k+1} \end{pmatrix} \tag{6}$$

Here the subscripts k,l refer to locations in the original matrices $A_1^r$, $A_1^i$ etc.

$\tilde{c}$ is circulant but not block diagonal. By performing row and column block Fourier transforms on this matrix it is converted to block diagonal matrix $\tilde{C}$ with 4×4 diagonal submatrices. Note that in this implementation the matrix equation (6) does not correspond to operations in the field of complex numbers and neither do the block diagonal elements of $\tilde{C}$ and therefore it is not possible to write the elements of $\tilde{C}$ as complex numbers. They remain as real-values entries corresponding to the separate real and imaginary parts.

In the case of a "least squares" solution, by adding thermal and receiver noise to the antenna samples a Fourier domain equation of the form can be obtained. Eqn. (7) shows how the matrix product is transformed in to the frequency domain to enhance the computation efficiency and reduce DSP workload. A block Fourier transform is used where, in this case, the blocks are of size 4. A block Fourier transform, defined in [4] for example, consists of a number of parallel FFT operations performed on a vector of blocks in which the correspondingly located elements of each block are isolated and a standard FFT is performed thereon. Note that the block Fourier transform of the convolution matrix reduces it to a block diagonal form as shown in Eqn. (9).

$$\tilde{Y} = \tilde{C}\tilde{X} + W \tag{7}$$

where Y is the block fourier transform (BFFT) of the vector y arranged with 4-length vector blocks, and W is a vector of uncorrelated complex-valued Gaussian noise with covariance $\sigma^2 I$. This equation can be solved, with the standard least squares assumption, as $$\hat{\tilde{X}} = (\tilde{C}^H \tilde{C} + \sigma^2 I)^{-1} \tilde{C}^H \tilde{Y} \tag{8}$$

where $(.)^H$ is an Hermitian transpose. The solution is numerically efficient since it only involves inversion of the 4×4 sub-matrices, not the whole matrix. Thus we assemble the left and right vector elements into groups of four and solve each group independently. Eqn. (8) therefore shows the desired least squares (LS) solution for the transmitted symbols $\tilde{X}$; this is a standard form of the solution readily appreciated by the skilled addressee. Since the matrix is now in block diagonal form, the computation count is very low.

$$\begin{pmatrix} \hat{\tilde{X}}_1 \\ \hat{\tilde{X}}_2 \\ \hat{\tilde{X}}_3 \end{pmatrix} = \tag{9}$$

-continued $$\begin{pmatrix} (\tilde{C}_1^H \tilde{C}_1 + \sigma^2 I)^{-1} & & \\ & (\tilde{C}_2^H \tilde{C}_2 + \sigma^2 I)^{-1} & \\ & & (\tilde{C}_3^H \tilde{C}_3 + \sigma^2 I)^{-1} \end{pmatrix} \begin{pmatrix} \tilde{C}_1^H \tilde{Y}_1 \\ \tilde{C}_2^H \tilde{Y}_2 \\ \tilde{C}_3^H \tilde{Y}_3 \end{pmatrix}$$

In the case of a direct FTT solution, the submatrices $\tilde{C}_m$ of Eqn. (9) can be found directly by FFT operations on the channel impulse responses. Letting these be $h_1^r(k), h_1^i(k)$; $h_2^r(k), h_2^i(k)$ k=0,1,2,3 . . . for the first and second downlink channels we have $$A_1^r = \begin{pmatrix} h_1^r(0) & & & \\ h_1^r(1) & h_1^r(0) & & \\ h_1^r(2) & h_1^r(1) & h_1^r(0) & \\ \vdots & & & \ddots \end{pmatrix} \tag{10a}$$

$$A_1^r P = \begin{pmatrix} 0 & -h_1^r(0) & & & \\ h_1^r(0) & -h_1^r(1) & & & \\ h_1^r(1) & -h_1^r(2) & 0 & -h_1^r(0) & \\ h_1^r(2) & -h_1^r(3) & h_1^r(0) & -h_1^r(1) & \\ \vdots & & & & \ddots \end{pmatrix} \tag{10b}$$

-continued $$A_2^i P = \begin{pmatrix} h_2^i(0) & & & \\ h_2^i(1) & h_2^i(0) & & \\ h_2^i(2) & h_2^i(1) & h_2^i(0) & \\ \vdots & & & \ddots \end{pmatrix} \quad (10c)$$

$$A_2^i P = \begin{pmatrix} 0 & -h_2^i(0) & & & \\ h_2^i(0) & -h_2^i(1) & & & \\ h_2^i(1) & -h_2^i(2) & 0 & -h_2^i(0) & \\ h_2^i(2) & -h_2^i(3) & h_2^i(0) & -h_2^i(1) & \\ \vdots & & & & \ddots \end{pmatrix} \quad (10d)$$

FIG. 5, with reference to Eqn. (6), shows the arrangement of elements in the first column of the time domain circulant matrix $\tilde{c}$.

Block-vector Fourier transformation of this column yield the same diagonal blocks $\tilde{C}_m$ of Eqn. (9).

$$\begin{pmatrix} \tilde{c}_0 \\ \tilde{c}_1 \\ \tilde{c}_2 \\ \tilde{c}_3 \end{pmatrix} \Rightarrow \text{Block } FFT \Rightarrow \begin{pmatrix} \tilde{C}_0 \\ \tilde{C}_1 \\ \tilde{C}_2 \\ \tilde{C}_3 \end{pmatrix} \quad (11)$$

To this point, conversion of the exemplary STTD block coding structure into a corresponding matrix structure for Fourier analysis has occurred. Equations 12 to 14 illustrate that the physical convolution in the multi-path channel is mathematically defined by the FFT operation of equation 14, i.e. the data is convolved in the multi-channel medium by the CIR to give the samples in the time domain at multiple antennas.

In STTD applications, the DSP load is increased at the rate of 1 FFT per extra antenna. Hence, with use of the present invention, STTD and similar coding can be FFT equalised with about a two-fold to three-fold increase in DSP load over an single transmit antenna system.

It is clear from this how to build up the matrix $\tilde{C}$ directly from the channel impulse response samples. The associated data and antenna samples for used with the column in FIG. 1 are as follows $$\text{Ant.:} \begin{pmatrix} y_1^r(0) \\ y_1^i(0) \\ y_2^r(0) \\ y_2^i(0) \\ y_1^r(1) \\ y_1^i(1) \\ \vdots \end{pmatrix} \quad \text{Data:} \begin{pmatrix} d^r(0) \\ d^i(0) \\ d^r(1) \\ d^i(1) \\ \vdots \end{pmatrix} \quad (12)$$

After forming the block DFT's of the vectors in this equation, the block convolution is equivalent to a point by point multiplication in the Fourier Domain.

$$Y_{2k} = H_{2k} D_{2k} + N_{2k} \quad k = 0 \ldots L-1 \quad (13)$$

The multiplication operation in Eqn. (13) is a matrix multiplication. The RAKE and joint detection algorithms in the Fourier domain are now $$\hat{D}_{2k}^M = H_{2k}^H Y_{2k} \quad (14)$$
$$\hat{D}_{2k}^{JD} = (H_{2k}^H H_{2k} + \sigma^2 I) H_{2k}^H Y_{2k} \quad k = 0 \ldots L-1$$

A terminal can use a plurality of receiving elements to enhance reception of the transmitted STTD signals. The straightforward modifications of the equations which allow this possibility are now described for a two element receiver array. In place of Eqn. (4) we have $$\begin{pmatrix} Y_1^r \\ Y_1^i \\ Y_2^r \\ Y_2^i \end{pmatrix} = \begin{pmatrix} (A_{11}^r + A_{12}^r P) & (-A_{11}^i + A_{12}^i P) \\ (A_{11}^i + A_{12}^i P) & (A_{11}^r - A_{12}^r P) \\ (A_{21}^r + A_{21}^r P) & (-A_{21}^i + A_{22}^i P) \\ (A_{21}^i + A_{22}^i P) & (A_{21}^r - A_{22}^r P) \end{pmatrix} \begin{pmatrix} X^r \\ X^i \end{pmatrix} \quad (15)$$

where $Y_1^r, Y_1^i, Y_2^r, Y_2^i$ are the real and imaginary parts of the sampled signals from the two antennas. Eqn. (15) now has matrix size 8×4 blocks and in the Fourier domain the circulant $\tilde{C}$ also has 8×4 blocks. In the least squares solution Eqn. (9) the matrix product $\tilde{C}_m^H \tilde{C}_m$ remains at 4×4. The order of the matrices which must be inverted does not increase as the number of diversity element increases though the "matched filter" product $\tilde{C}_m^H \tilde{Y}_m$ does increase its share of the work load in proportion.

In the case of an FFT equaliser of the preferred embodiment, the channel impulse response is written into the elements of a channel matrix, as exemplified in FIG. 5. Indeed, FIG. 5 is a time domain matrix of Eqn. (10), with the matrix developed from Eqn. 3 and Eqn. 4. FIG. 5 is an exemplary organisation of CIRs for a two element transmitter and a single element receiver (of STTD), the matrix being suitable for processing by a block FFT. The matrix of FIG. 5 is therefore stored in memory 150. Furthermore, as regards the CIRs within FIG. 5, CIRs have been separated into their real and imaginary parts, respectively, while the user data symbols and the receiving antenna signals are similarly separated out in a conformant fashion. The channel matrix can be modified to a circulant matrix form such that an exact FFT method is applicable.

With knowledge of the channel and conversion of received signals into a matrix supporting FFT processing, the FFT function can be performed on the channel matrix, the user symbol matrix and the received data symbols such that the spectrum of the received signals is a linear combination of the spectra of the signals transmitted from the two antennas. In other words, at every frequency there is a linear matrix relationship between the transmitted signals from the multiple transmit elements. Eqn. (15) can be solved for the transmitted user data symbols independently in each Fourier bin; this is a low complexity operation since the matrices are small, typically 2×2 or 4×4. Finally, the spectrum of the estimated user symbols is inverse transformed into the time domain to recover the data estimate, as previously described.

In the estimation of a work load, for an N-element receiving antenna we require N FFT's of the received data samples on a block length which is somewhat larger than the packet size of the data. A 256-point FFT would be suitable for a 192-chip data packet. The N channel impulse responses must also be FFT'ed. Every second input complex chip at the antenna requires the inversion of a 4×4 real matrix which takes a nominal $4^3=64$ FLOP's (FLOP=floating point operation). After equalisation in the Fourier domain the data is inverse FFT'ed.

By way of example, for a packet size of one hundred and ninety-two chips/bits (and allowing for sample shuffle overheads), the work is about $2(N+1)$ 256-point FFT's plus ninety-six real matrix inversions of order 4×4. For at two channel/element receiver, the computational count per sample is:

$$6 \times 256 \times \log_2(256) + 96 \times 4^3 = 18432 \text{ FLOPs}$$

At an exemplary sample rate of 1.2288 mega-symbols per second (MS/s) and a packet repetition rate of 1228.8/192 (i.e. 6.4 kHz), the work rate for the two channel/element receiver is therefore:

$$6.400 \times 18432 = 118 \text{ MFLOPs}$$

The present invention has demonstrated that a joint detection algorithm, providing inter-code orthogonalisation and inter-symbol interference reduction for an STTD coded transmission, is attainable and feasible from a computation load criterion when performed in the Fourier domain. The present invention is not restricted to STTD techniques nor CDMA techniques but also other types of digital receivers, including STC coded systems having multiple blocks of data communicated to at least one receive antenna element (and usually a plurality of receive antenna elements) from multiple transmit antenna elements and producing multiple output streams of data.

Figure 6:
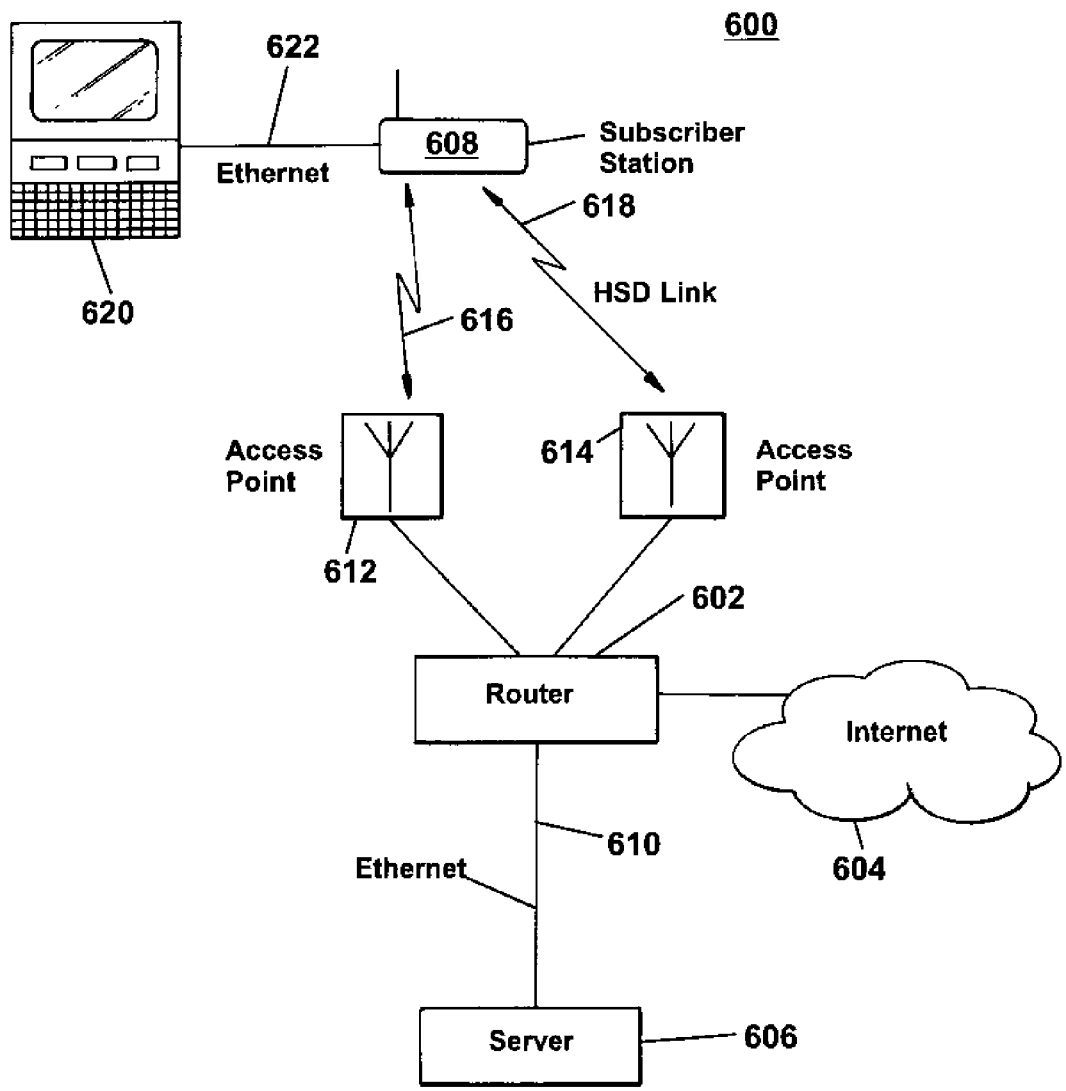
FIG. 6 shows the high level architecture of the wireless data system in which the present invention may be employed.

FIG. 6 shows the high level architecture of the wireless data system 600 in which the present invention may be employed. The system 600 includes a router 602 providing access to the Internet 604 (or the like) from a server 606 or subscriber station 608. The server may be coupled to the router via an Ethernet connection 610. The router 602 supports a plurality of access points 612, 614 that provide wireless access to the subscriber station 608 over high-speed data-links 616, 618. The subscriber station 608 may provide further access to a computer 620 via an Ethernet or Infrared connection 622. The access points may themselves contain multiple transmit elements to support the embodiments of FIG. 4.

The joint detection algorithm of the preferred embodiment can be implemented in a self-contained integrated chip, as would be available from a major semi-conductor manufacturer or a sub-routine can be installed into an ASIC chip. Use of the Fourier domain processing mechanism of the preferred embodiment (for channel impulse response correction) greater reduces power consumption in a third generation subscriber terminal.

Alternative embodiments of the invention may be implemented as computer program code encoded on a computer program product for use with a computer system. It is expected that such a computer program product may be distributed as a removable medium with accompanying printed or electronic documentation (e.g. shrink-wrapped software), preloaded with a computer system or distributed from a server or electronic bulletin board over a network (e.g. the Internet or World Wide Web). A series of computer instructions can therefore either be fixed on a tangible medium or fixed in a computer data signal embodied in a carrier wave that is transmittable to a computer system using wireline or wireless transmission techniques. The removable (i.e. tangible) medium may be a computer readable media, such as a diskette, CD-ROM, DVD-ROM or RAM, fixed disk, magneto-optical disks, ROMs, flash memory or magnetic or optical cards. The series of computer instructions embodies all or part of the functionality previously described herein with respect to the system.

Software embodiments are represented in FIG. 1 by a CD-ROM 70, the CD-ROM being shown as loadable into the exchange 12. Of course, in software based embodiments, requisite code may be required to be downloaded into multiple physical entities, including the exchange and the modem associated with the customer premises.

Software embodiments of the invention may be implemented in any conventional computer programming language. For example, preferred embodiments may be implemented in a procedural programming language (e.g. "C") or an object oriented programming language (e.g. "C++").

Although the preferred operating method is realised by general or specific-purpose processor or logic circuits programmed with suitable machine-executable instructions, hardware components may possibly be used to implement certain features of the present invention. Of course, the present invention may be performed by a combination of hardware and software.

It will, of course, be appreciated that the above description has been given by way of example only and that modifications in detail may be made within the scope of the present invention. For example, while the preferred embodiment has been described in the context of a CDMA system, the present invention is generally applicable to any dispersive or imperfect channel that acts to corrupt symbols, including systems employing TDD and FDM techniques and other types of links, such as digital subscriber lines (DSL) and all digital transmission systems. Indeed, the matrix manipulation techniques of the preferred embodiment of the present invention (pertaining to multi-element transmissions and channel equalization) can be applied to space-time coding (STC) techniques. In the context of the present invention, FFTs are the preferred form of transform operation, although the skilled addressee will appreciate that other equivalent forms of fast transform can be used, e.g. fast wavelet transforms. Consequently, the term FFT is not limiting in the context of the present invention and the term "fast transform" should be construed broadly to include, amongst other forms of transforms, both FFT and fast wavelet transforms, for example.

The invention claimed is:

1. A method of channel equalisation comprising:
   receiving a data stream generated from a plurality of space time coded (STC) data streams received from a plurality of transmit antenna elements;
   generating via a fast transform a packet spectrum of at least a portion of the data stream, the packet spectrum being a transform domain representation;
   receiving a training sequence for a channel through which the data stream has been sent and assessing a channel impulse response for the channel based on the training sequence;
   generating via a fast transform a channel impulse response spectrum in the transform domain for the channel impulse response;
   equalising the packet spectrum with the channel impulse response spectrum to produce an equalised packet spectrum in the transform domain; and
   converting the equalised packet spectrum into time domain equalised data for recovery of information.

2. The method of claim 1, wherein equalising the packet spectrum further includes:
   deconvolving transmitted and received data streams with respect to channel impulse response spectra, thereby to produce at least one equalised data stream.

3. The method of claim 1, wherein equalising the packet spectrum includes performing a minimum mean square error (MMSE) spectral ratio comparison.

4. The method of claim 1, further comprising truncating the channel impulse response spectra to limit processing and enhance accuracy associated with equalising the packet spectrum.

5. The method of claim 1, wherein assessing the channel impulse response for the channel based on the training sequence further includes assessing a matrix-valued channel impulse response.

6. The method of claim 1, further comprising receiving the data stream at a plurality of receive antenna elements.

7. The method of claim 1, wherein the fast transform is a Fourier transform.

8. The method of claim 1, wherein the data stream is distributed in slots across a plurality of frames, each slot including the training sequence.

9. The method of claim 1, wherein the data stream is arranged such that a code-word level construction of a Space Time Transmit Diversity (STTD) signal is modified to a chip-level construction in which Code Division Multiple Access (CDMA) code words are interleaved at a chip level instead of being transmitted whole in sequence.

10. The method of claim 1, wherein the data stream is a slot of a data frame and the method further comprising reading the slot into memory.

11. The method of claim 10, wherein said at least a portion of the data stream includes a packet overlap.

12. A computer program product for a processor of a channel equaliser, the computer program product comprising:
   code that supports reception of a data stream generated from a plurality of space time coded (STC) data streams received from a plurality of transmit antenna elements;
   code that generates via a fast transform a packet spectrum of at least a portion of the data stream, the packet spectrum being a transform domain representation;
   code that supports reception of a training sequence for a channel through which the data stream has been sent and code that assesses a channel impulse response for the channel based on the training sequence;
   code that generates via a fast transform a channel impulse response spectrum in the transform domain for the channel impulse response;
   code that equalizes the packet spectrum with the channel impulse response spectrum to produce an equalised packet spectrum in the transform domain; and
   code that converts the equalized packet spectrum into time domain equalized data for recovery of information;
   wherein the codes reside in a computer readable medium.

13. The computer program product of claim 12, further comprising:
   code that deconvolves transmitted and received data streams with respect to channel impulse response spectra, thereby to produce at least one equalised data stream, the code that deconvolves associated with the code that equalizes the packet spectrum.

14. The computer program product of claim 12, further comprising:
   code that assesses a matrix-valued channel impulse response, said code associated with the code that assesses the channel impulse response for the channel based on the training sequence.

15. The computer program product of claim 12, further comprising:
   code that modifies a code-word level construction of an Space Time Transmit Diversity (STTD) signal into a chip-level construction in which Code Division Multiple Access (CDMA) code words are interleaved at a chip level instead of being transmitted whole in sequence.

16. An integrated chip having a controller programmed to provide a channel equalisation function, the controller comprising:
   a first receiver chain arranged, in use, to receive a data stream generated from a plurality of space time coded (STC) data streams received from a plurality of transmit antenna elements;
   a first fast transform function arranged to generate a packet spectrum of at least a portion of the data stream, the packet spectrum being a transform domain representation;
   a second receiver chain arranged, in use, to receive a training sequence for a channel through which the data stream has been sent;
   a channel impulse response estimator for assessing a channel impulse response for the channel based on the training sequence;
   a second fast transform function arranged to generate a channel impulse response spectrum in the transform domain for the channel impulse response;
   an equalizer arranged to equalise the packet spectrum with the channel impulse response spectrum to produce an equalised packet spectrum in the transform domain; and
   an inverse transform function arranged to convert the equalised packet spectrum into time domain equalised data for recovery of information.

17. The integrated circuit of claim 16, wherein the equalizer further includes:
   a deconvolving function arranged to deconvolve transmitted and received data streams with respect to channel impulse response spectra, thereby to produce at least one equalised data stream.

18. An equaliser comprising:
   a first input for receiving a data stream generated from a plurality of space time coded (STC) data streams received from a plurality of transmit antenna elements;
   a processor arranged to select a sub-slot of data from the data stream and to implement a fast transform on the sub-slot to generate a packet spectrum for the sub-slot of data, the packet spectrum being a transform domain representation;
   means for storing a channel impulse response spectrum generated from a fast transform of a channel impulse response of a channel through which the data stream has been sent, the channel impulse response spectrum being in the transform domain;
   a least squares spectral ratio comparator coupled to receive the packet spectrum and the channel impulse response spectrum, the least spectral ratio comparator having an output providing an equalised packet spectrum in the transform domain; and
   means for converting the equalised packet spectrum into time domain equalised data for recovery of information.

19. The equaliser of claim 18, further includes:
means for deconvolving transmitted and received data streams with respect to channel impulse response spectra, thereby to produce at least one equalised data stream.

20. The equaliser of claim 18, further comprising means for truncating the channel impulse response spectra to limit processing and enhance accuracy associated with equalising the packet spectrum.

21. The equaliser of claim 18, further comprising a memory storing a matrix-valued channel impulse response.

22. The equaliser of claim 18, the equaliser coupled to receive the data stream through a plurality of receive antenna elements.

23. The equaliser of claim 18, wherein the first and second fast transforms are Fourier transforms.

24. The equaliser of claim 18, wherein the data stream includes the training sequence.

25. The equaliser of claim 18, wherein the data stream is selected from a group comprising: STTD signals; transmit diversity signals; and STC signals.

26. A radio communication device comprising the equaliser having:
a first input for receiving a data stream generated from a plurality of space time coded (STC) data streams received from a plurality of transmit antenna elements;
a processor arranged to select a sub-slot of data from the data stream and to implement a fast transform on the sub-slot to generate a packet spectrum for the sub-slot of data, the packet spectrum being a transform domain representation;
means for storing a channel impulse response spectrum generated from a fast transform of a channel impulse response of a channel through which the data stream has been sent, the channel impulse response spectrum being in the transform domain;
a least squares spectral ratio comparator coupled to receive the packet spectrum and the channel impulse response spectrum, the least spectral ratio comparator having an output providing an equalised packet spectrum in the transform domain; and
means for converting the equalised packet spectrum into time domain equalised data for recovery of information.

27. An equaliser comprising an input, a Random Access Memory (RAM) block, a RAM sample block, a spectrum ratio calculator having a first input connected to the RAM sample block and a second input connected to a RAM having an impulse response spectrum;
wherein the equaliser is operable to:
receive a data stream generated from a plurality of space time coded (STC) data streams received from a plurality of transmit antenna elements;
fill a RAM memory block; converting the data stream by way of a fast Fourier transform operation to provide a sample RAM block $Y_k$ (packet spectrum) and providing the data stream to a first input of an equaliser; and
receive, at a second input of the equaliser, an impulse response spectrum held within the RAM, which impulse response spectrum is a fast Fourier transform of the channel impulse response;
thereby to equalise the data stream whereby to provide an equalised packet spectrum which undergoes an inverse fast Fourier transform to provide equalised packet waveforms.

* * * * *